W. CHRISTY.
PIPE JOINT.
APPLICATION FILED MAR. 23, 1909.
967,611.
Patented Aug. 16, 1910.
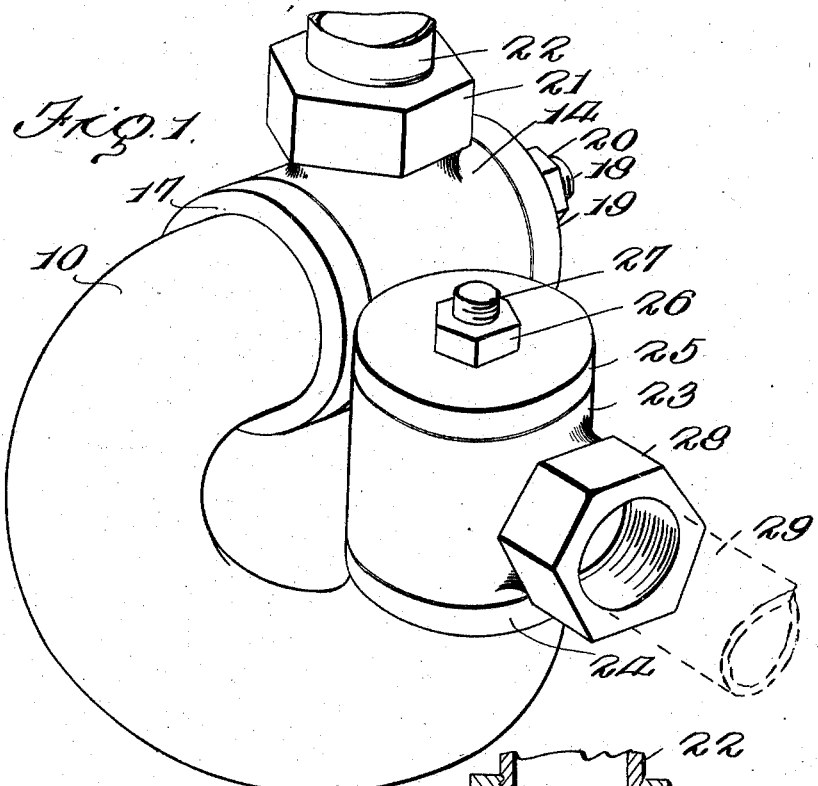
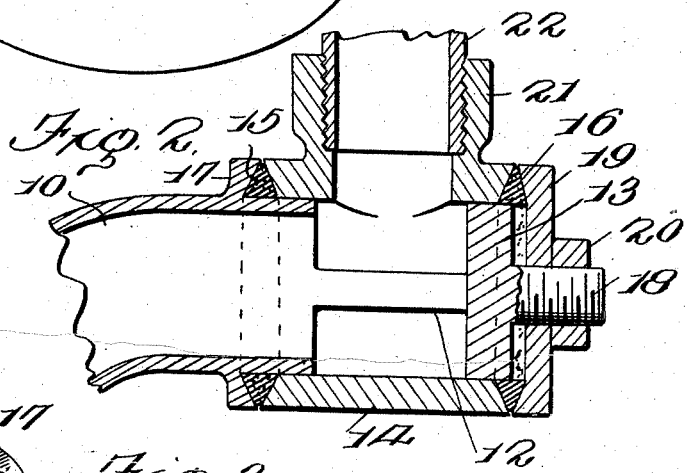
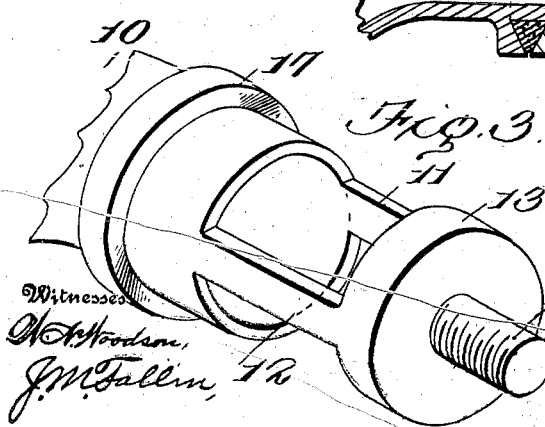
Inventor
W. Christy

UNITED STATES PATENT OFFICE.

WESLEY CHRISTY, OF GLOBE, ARIZONA TERRITORY.

PIPE-JOINT.

967,611.  Specification of Letters Patent.  Patented Aug. 16, 1910.

Application filed March 23, 1909. Serial No. 485,314.

*To all whom it may concern:*

Be it known that I, WESLEY CHRISTY, citizen of the United States, residing at Globe, in the county of Gila and Territory of Arizona, have invented certain new and useful Improvements in Pipe-Joints, of which the following is a specification.

This invention relates to pipe couplings and joints and has particular reference to a joint which is especially applicable to steam pipes, oil pipes or any form of pipe through which a compressed medium is transmitted.

An object of this invention is to provide a joint which is sealed and which at the same time will admit of lateral and vertical adjustment so as to act as a universal joint and one which at the same time is strong and durable and one which may be applied to the extremities of pipes of common formation.

The invention further contemplates the construction of a joint which comprises few operative parts so as to provide few bearing surfaces to be worn by frictional contact and thereby produce an efficient and adaptable device for practical use.

For a full understanding of the invention reference is to be had to the following description and accompanying drawings, in which:—

Figure 1 is a perspective view of the improved coupling. Fig. 2 is a longitudinal section through one end thereof, and Fig. 3 is a detailed perspective of the core which is formed on the end of the curved pipe of the coupling.

Corresponding and like parts are referred to in the following description and indicated in all the views of the drawings by the same reference characters.

In the drawings in which is disclosed an embodiment of this invention, the numeral 10 designates a section of piping which is cast or otherwise formed into arcuate formation having the open ends of the same disposed at substantially right angles to one another, one end being curved outwardly from the plane of the other. At one extremity of the arcuate pipe section 10 the same is provided with forwardly extended ribs 11 and 12 which are disposed oppositely and extended in parallel where their outer ends are engaged with a head 13 which is of disk formation. The ribs 11 and 12 are considerably reduced in order to form extensive openings upon the opposite sides of the same between the extremity of the pipe 10 and the head 13. The pipe 10 is provided at its outer end with a sleeve 14 which is rotatably disposed thereon and extending about the ribs 11 and 12 and engaged at its outer end about the head 13. The sleeve 14 is provided at its opposite ends with inwardly beveled faces against which are positioned gaskets 15 and 16 to seal the joint formed between the sleeve 14, the pipe 10 and the head 13. The pipe 10 is provided at its end with an annular flange 17 which is inwardly beveled at its outer face to engage oppositely against the adjacent gasket 15 to confine the movements of the sleeve 14 when positioned upon the end of the pipe. The head 13 is provided with an outwardly projected and threaded stem 18 which supports a cap 19 provided with an inwardly beveled inner face of the gasket 16 and adapted to be held in locked position thereagainst by means of the lock-nut 20. The sleeve 14 is provided at one side with a threaded coupling 21 for the reception of the externally threaded extremity of a pipe 22. The opposite extremity of the arcuate pipe section 10 is likewise formed and is provided with a sleeve 23 which is disposed about the same and secured in such position by means of the flange 24 and the cap 25, the cap 25 being held in position through the medium of the lock-nut 26 which is mounted upon the threaded stem 27 formed upon the end of the pipe 10.

It is readily observed from the drawings that the sleeves 14 and 23 are permitted to rotate, but in opposite planes so that the entire joint may be operated as a universal joint in pipe connections where such free movement is necessary.

In positioning a coupling of this construction the arcuate section 10 is secured in the sleeve 14 by the insertion of the heads 13 therein, a gasket 15 being interposed between the flange 17 and the inner end of the sleeve 14 when the gasket 16 is engaged about the head 15 and impinged against the outer end of the sleeve 14 by means of the cap 19 which is locked in position through the medium of the nut 20. The opposite sleeve 23 is likewise positioned upon the pipe section 10 and is likewise permitted to rotate about the same. The sleeve 23 is provided with a threaded pipe engaging section 28 into which a suitable threaded pipe 29 is positioned.

Having thus described the invention what is claimed as new is:—

A pipe coupling including a section of pipe having an annular flange adjacent its end with an inwardly beveled outer face and a pair of oppositely disposed ribs extending outwardly from the extremity of the pipe section, said pipe section also having a circular head upon the extremities of the ribs and a threaded stem projecting outwardly from the head, a sleeve disposed over the outer end of the pipe section and the head having inwardly beveled faces at its ends, a cap disposed in threaded relation over the stem and having an inwardly beveled inner face, and gaskets disposed against the ends of the sleeve beneath said flange and said cap, said cap being adapted to compress the gaskets between the ends of the sleeve and said flange and said cap.

In testimony whereof I affix my signature in presence of two witnesses.

WESLEY CHRISTY. [L. S.]

Witnesses:
 WILLIAM DECALB KENDRICK,
 W. F. RAWLINGS.